United States Patent [19]

Schoute

[11] Patent Number: 4,809,318
[45] Date of Patent: Feb. 28, 1989

[54] METHOD OF OVERLOAD CONTROL FOR THE CENTRAL CONTROL OF A TELECOMMUNICATION SYSTEM AND ARRANGEMENT FOR IMPLEMENTING THE METHOD

[75] Inventor: Frederik C. Schoute, Hilversum, Netherlands

[73] Assignee: U.S. Philips Corporation, New York, N.Y.

[21] Appl. No.: 101,917

[22] Filed: Sep. 28, 1987

[30] Foreign Application Priority Data

Sep. 29, 1986 [NL] Netherlands .................. 8602452

[51] Int. Cl.$^4$ ...................... H04M 3/36; H04Q 3/545
[52] U.S. Cl. ..................................... 379/279; 379/113
[58] Field of Search ................. 379/113, 34, 279, 284, 379/273, 195, 134

[56] References Cited

U.S. PATENT DOCUMENTS

| | | | |
|---|---|---|---|
| 4,497,978 | 2/1985 | Schoute et al. | 379/279 |
| 4,613,729 | 9/1986 | Daisenberger | 379/113 |
| 4,649,234 | 3/1987 | Jans | 379/138 |
| 4,658,098 | 4/1987 | Wegmann | 379/113 |

OTHER PUBLICATIONS

"Traffic Calculations in SPC Systems", J. E. Villar, *Electrical Communication*, vol. 52, No. 3, 1977, pp. 199–205.
"The Analysis of System X Processor Performance Under Transient Traffic Conditions", J. Bonser, *British Telecomm. Engr.*, vol. 4, Jan. 1986, pp. 199–202.

Primary Examiner—Thomas W. Brown
Attorney, Agent, or Firm—Thomas A. Briody; Jack E. Haken; Anne E. Barschall

[57] ABSTRACT

The central processor of a telecommunication system is designed for performing many as well as a great variety of tasks. Owing to the more or less accidental character of the demand for processor time (long) waiting times can arise or even overload can occur. The method according to the invention has for its object to avoid this or to control this. As a measure for processor load it is suggested to take the number of calls in build-up phase and the queue length (the number of tasks waiting to be processed by the processor). Based on the value of the maximum number of tasks-in-process determined again and again it is detected whether a new task is acceptable in view of the tasks still waiting to be performed.

5 Claims, 2 Drawing Sheets

METHOD OF OVERLOAD CONTROL FOR THE CENTRAL CONTROL OF A TELECOMMUNICATION SYSTEM AND ARRANGEMENT FOR IMPLEMENTING THE METHOD

BACKGROUND OF THE INVENTION

1. Field of the Invention

The invention relates to a method of overload control for the processor of the central control of a telecommunication system, more specifically a telephone exchange of the type commonly referred to as the Stored Program Controlled (SPC) type, which method comprises the following steps:

(1) determining the number of calls in build-up phase in a first period of a predetermined length;

(2) determining the demand on the capacity of the processor of the central control in the aforesaid first period;

(3) estimating the maximum number of calls in the build-up phase which the processor is capable of processing simultaneously in a second period of a predetermined length;

(4) determining with each new offered call in the aforesaid second period whether as a as a result of the new call the instantaneous number of calls in the build-up phase reaches the maximum number of calls estimated in step (3);

(5) accepting the offered call if the number of calls estimated in step (3) was not reached;

(6) rejecting the offered call if the estimated number was reached;

(7) repeating steps (1) to (6) in a subsequent first period evaluating calls in a subsequent second period.

2. Prior art

Such a method is known from the European Patent Application EP No. 096.937. In the aforesaid patent application it is suggested to derive the maximum number of (telephone) calls which may be processed in a given period from a combination of the number of calls which were being processed in a preceding period and the demand on the capacity of the central control in this period. This demand usually consists of two components: the processor of the central control has to perform telephony tasks in a narrow sense (taking up receiver, signalling, path finding, metering and so on) but also performs tasks of a more general, administrative nature such as making operative or blocking, subscriber connections, locating errors and processing errors and (traffic) measurements.

SUMMARY OF THE INVENTION

It is an object of the invention to provide a method of overload control with which for the processor load an imminent overload is effectively and efficiently averted, based on a single criterion and which criterion can be determined in a simple way. In accordance with the invention the method of the type mentioned in the preamble is characterized in that the number of tasks waiting to be processed by the processor—the queue length—is used as a criterion for the demand on the capacitor to be determined in step (2) and that the estimation made in step (3) is based on the number of calls in build-up phase and the queue length in the first period.

The relationship between the queue length and the number of calls in build-up phase is strongly non-linear causing minor variations in the number of calls in build-up phase to entail a large variation in the queue length. It is favourable if the queue length $N_i$ is transformed according to $1/(1+N_i)$. This achieves a substantially linear relationship between $1/(1+N_i)$ and the number of calls in build-up phase so that the estimation of the maximum number of calls in build-up phase at any moment is much less subject to fluctuations.

The invention further relates to an arrangement for implementing the method of overload control for the central control of a telecommunication system, comprising a first storage arrangement, a second storage arrangement, for storing the value of the number of calls in build-up phase in the first period, a second arithmetic unit for determining from the values recorded in the two storage arrangements the maximum number of calls in the build-up phase, a counter for counting the instantaneous number of calls in the build-up phase in a second period, a difference-producing unit for comparing the counting position to the maximum number of calls that can be in the build-up phase, a change-over switch, an acceptance unit and a call detector, the change-over switch connecting the acceptance unit or the rejection unit, as the case may be, to the call detector under the control of the difference-producing unit, the acceptance unit being connected to the input of the counter for incrementing the counting position by one when a call is accepted, an output of the counter being connected to an input of the second storage arrangement for recording the counting position during or at the end of the second period.

In accordance with the invention the arrangement is characterized in that it comprises a register for temporarily storing the value of the queue length and likewise comprises a first arithmetic unit connected to an output of the aforesaid register for determining a magnitude related to the queue length, the magnitude being stored in the first storage arrangement connected to an output of the first arithmetic unit.

BRIEF DESCRIPTION OF THE DRAWINGS

The invention and its advantages will further be described in more detail with reference to the drawing wherein.

DETAILED DESCRIPTION OF THE PREFERRED EMBODIMENT

Figure 1:
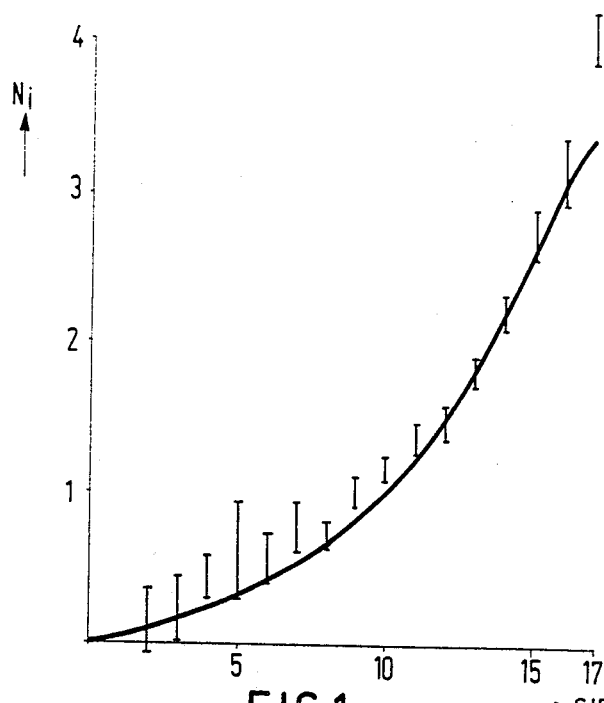
FIG. 1 shows a graph of the variation of the average queue length $N_i$ as a function of the number of calls in build-up phase.

In telecommunication systems comprising a central control, for making, maintaining and breaking up connections, a processor is used forming part of the central control. In automatic telephone exchanges of the stored program controlled (SPC) type signalling, path searching, metering and traffic observation for error detection, that is to say telephony tasks in a narrow sense, are performed by the central control. In addition, the central control also performs tasks of an administrative nature (for example making operative or blocking, as the case may be, subscriber connections) of a supervisory nature (locating errors, processing errors) and of a measuring nature (for example traffic measurements). For economic reasons the central control is dimensioned such that the average load to be expected can be easily processed. However, in the event of peak loads overload may occur so that offered calls have to be rejected. In addition, in such situations long queues of telephony tasks for the processor occur as a result of which the requirements as regards response can no longer be met either. As processor time is spent on rejected calls as well as on unsuccessful calls as a result of the subscriber's impatience, the number of successfully processed calls will decrease.

The invention provides a method of overload control for the central control. The invention is based on the understanding that a good criterion for the load of the central control is found in the combination of the number of calls in build-up phase and the so-called queue length. By queue length is meant the number of tasks waiting to be performed by the processor of the central control.

Overload can be prevented by restricting the number of calls admitted to the build-up phase to a given maximum in case of imminent overload. This can be achieved by the dialling registers which the subscribers connected to the exchange can jointly dispose of in case of imminent overload. In case of imminent overload the number of available dialling registers will be reduced whereas with a decreasing load the number of dialling registers can (will) be increased to for example a number corresponding to the average load over for example a week. It is impractical to restrict the number of dialling registers to a predetermined fixed maximum as the traffic characteristic of an exchange can occasionally and structurally differ considerably from the excepted characteristic at the time when the exchange was installed. Indeed, the method of overload control intends to provide a self-adjusting, adaptive way of determining the number of dialling registers.

The queue length appears to be a good indication for the processor load; it at once indicates how much "work" is still waiting for completion at the relevant instant. In addition, in case of overload the queue length also indicates the extent to which the processor is overload. (If, for example, the idle fraction (the number of idle jobs) of the processor is used as an indication of overload this will fail to provide any insight in the extent of the overload.)

In FIG. 1 is shown in a graph the relation between the average queue length ($N_i$) and the number of calls in build-up phase (CIB). From the graph it appears that from a specific value for the number of calls in build-up phase (CIB) the average queue length strongly increases with a further increase of CIB. The graph is obtained from simulation data. The maximum number of calls in build-up phase (CIB) is limited to 17. Consequently, new calls are only accepted if there are less than 17 calls in the build-up phase. In this simulation a call is assumed to comprise eight activities for the processor: taking up the receiver (56 msec), (dialling) digit 1 (16 msec), digit 2 (16 msec), digit 3 (16 msec), digit 4 (74 msec), taking up receiver b (12 msec), putting down 1 (32 msec) and putting down 2 (16 msec). The required processor time is stated in brackets. Thus a total of 256 msec of processor time is required for a single call. Let the overall time for a call build-up take 5 seconds, 1 building-up of a call will then imply $(0.256/5) \times 100\% = 5\%$ processor load. With 17 calls (the maximum number of calls represented in FIG. 1) the processor load will thus be approximately 85 %. This explains why the average queue length $N_i$ in FIG. 1 assumes only rather limited values.

If the required processor time differs from the 0.256 msec value assumed hereinafter by way of example the strong increase of the average queue length will occur at a value for the number of calls in build-up phase different from the one indicated in FIG. 1. The uncertainty with respect to the maximum number of calls in build-up phase to be accepted which results from the above fact and from the fact that the average queue length is a non-linear function of the number of calls in build-up phase, will be removed in the way disclosed hereinbelow.

The decision about the maximum number of calls accepted to be built-up in a specific period (for example 1 day or 1 week), is based—as stated hereinbefore on two magnitudes: the number of calls in build-up phase and the queue length. Determining the number of calls which may be in the build-up phase simultaneously in a first period of a predetermined duration can be done by counting how many calls were in the build-up phase in the relevant period (on an average). This can be achieved by taking a number of samples (for example every 4th second) within this first period. The procedure is as follows: Each sub-period (for example 4 seconds) a sample-pair is taken of queue length $N_i$ and calls in build-up phase $CIB_i$. At the end of a period (for example 1 week or 1 day) the average queue length going with CIB=12 (just by way of example) is determined by taking from all collected sample-pairs the samples having $CIB_i = 12$ and subsequently the associated $N_i$. In the second, the third and generally in each further period this sampling is repeated.

The queue length is determined at the same instant (or instants). In a manner still further to be described a value commonly referred to as call acceptance limit CAL is determined from the measurement of the queue length and the number of calls in build-up phase in a first period.

The call acceptance limit is assumed to hold for a specified future time, namely a second period of a predetermined value. Every offered call reaching the central control in this second period will increment the number of calls in build-up phase by one. It is then checked whether the call acceptance limit is thereby reached. If the total of the instantaneous number of calls in build-up phase incremented by the actual call remains below this limit the call is taken to be a call in build-up phase and the number of calls in build-up phase is increased by one. If, on the other hand, the limit is reached the call will be rejected. Whether a call is taken to be a call in build-up phase or not taken will be reported to the subscriber by following the normal, known processing method (for example by applying a dial tone or a busy tone, as the case may be, to the subscriber set). Each call made in the second period is processed in this manner, that is to say accepted or rejected. It is to be considered, though, to have a call wait for a short while after it has been rejected, and then try to obtain acceptance once again. For during that period the number of calls in build-up phase may have dropped below the limit as a consequence of the building-up of a number of calls being accomplished in that period. The number of calls in build-up phase in the second period is the balance of the number of calls which used to be in the build-up phase at the beginning of this second period, the number of calls accepted to the build-up phase since then and the number of calls which were processed.

At the end of the second period the entire cycle is repeated for a next, successive third and fourth period. In this third period, however, the actualized CAL is used. The periods can be in the order of a day or a week but can also be only a few seconds. If the amount of traffic or the composition of traffic varies only little or if only a structural change is to be coped with, a long period (for example a week) will be sufficient. If fast changes should be reacted to, a short period (preferably a few seconds) is to be preferred. In both cases it should be considered to have the periods partly overlap thus avoiding strong limit fluctuations.

Figure 2:
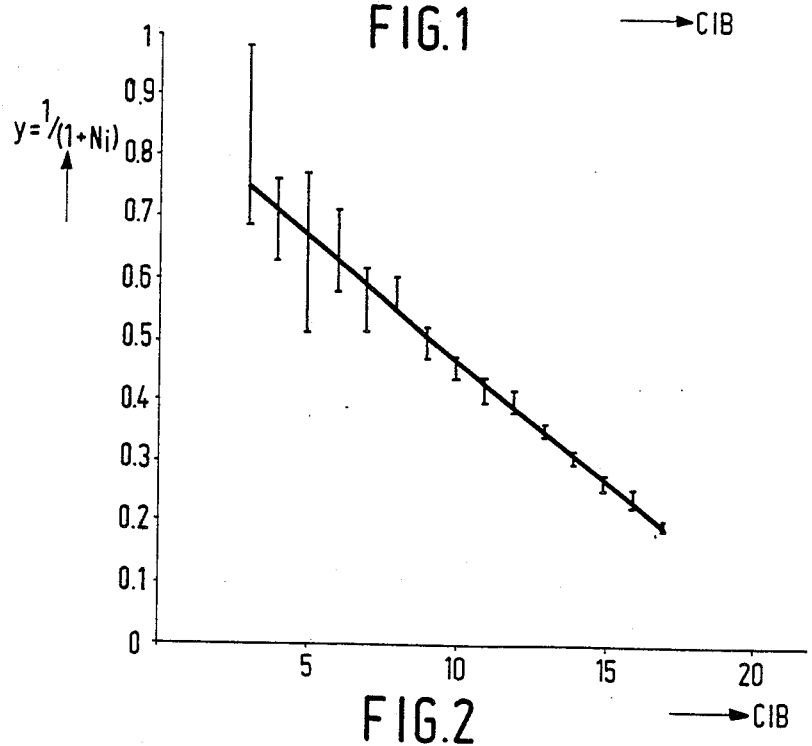
FIG. 2 shows a graph of the variation of the magnitude y where $Y=1/(1+N_i)$ as a function of the queue length which graph underlies the method in accordance with the invention.

As already stated hereinbefore, the relationship between the queue length $N_i$ and the number of calls in build-up phase CIB (FIG. 1) is not only strongly non-linear but also dependent on among other things the amount of processor time required for further processing a call. Now it is established that the relationship between the queue length $N_i$ and the number of calls in build-up phase CIB becomes substantially linear if not the queue length $N_i$ but the magnitude $y = 1/(1+N_i)$ is plotted against the number of calls in build-up phase (see FIG. 2). The number of calls that may be taken in the build-up phase so as to have the queue length not exceed a certain limit can then be deducted from this fairly easily. With a queue length of for example 9 solving the equality $y = a.CAL + b$ with $y = 1/(1+N_i) = 0.1$ where $a = 0.0397$ and $b = 0.8680$ yields a value for the CAL equal to 19.35. The parameters a and b are determined from the linear regression applied to the values of the simulation graph. By setting the call acceptance limit to 19 the average number of tasks to be processed by the processor in a next period with a maximum number of calls in build-up phase can be limited to nine. (This is only an approximation and holds only to the extent that the amount of traffic and the composition thereof in the next period differ too drastically from the measured values in the preceding period).

Figure 3:
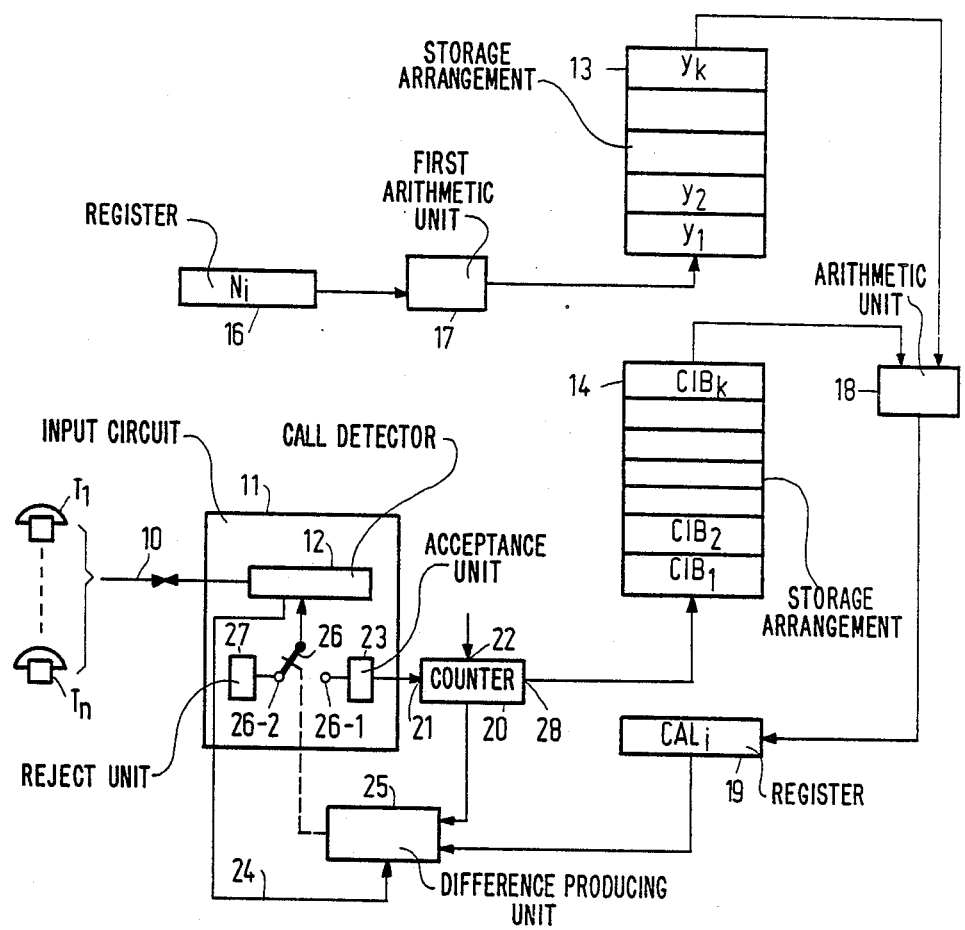
FIG. 3 shows a diagram of an arrangement for implementing the method in accordance with the invention.

An embodiment of an arrangement for implementing the method of overload control is represented in FIG. 3 by way of a block diagram. The subscriber sets T1, ... Tn are each connected to an input circuit 11 of the telecommunication system via a two-way connection 10. The two-way connection 10 is connected to a call detector 12 comprised in the input circuit 11 and used to establish whether a subscriber makes a call. The input circuit 11 should be enabled to either accept or reject the offered calls. Thereto the arrangement comprises the following means. In storage arrangement 13 containing k memory locations, there are the values y indicating a measure for the queue length in the preceding k sub-periods namely $y_1, y_2, \ldots y_k$. These k values form as it were the k samples of the queue length in a first period. A value $y_j$ representative of the queue length for the processor for example at the end of a sub-period j, is found by starting from the number of tasks $N_j$ waiting to be performed by the processor at the end of the period j.

$$y_j = 1/(1+N_j) \quad (1)$$

In each sub-period j the value of $N_j$ is offered to register 16. An output of this register is connected to a first arithmetic unit 17 computing the value of $y_j$ in accordance with formula (1). At the end of each sub-period j the value of y, in this sub-period j is written into the storage arrangement 13. This is done such that the most recently computed value of y replaces the least recent value in the storage arrangement 13. Therefore, the storage arrangement 13 always contains the k most recent values (samples) of y. In FIG. 3 the values $j = 1, 2, \ldots k$ are shown.

In storage arrangement 14, also containing k locations, there are the k values of the number of calls in build-up phase $CIB_j$ in the last k sub-periods. The values of $CIB_j$ in storage arrangement 14 relate to the same subperiods as those of $y_j$ in memory 13.

The arithmetic unit 18 computes from the values stored in the storage arrangements 13 and 14 the linear regression parameters a and b according to $$a = \frac{k\Sigma CIB_j \cdot y_j - \Sigma CIB_j \Sigma y_j}{k\Sigma CIB_j^2 - (\Sigma CIB_j)^2} \quad (2)$$

$$b = \frac{y_j \Sigma CIB_j^2 - \Sigma CIB_j \cdot \Sigma CIB_j \cdot y_j}{k\Sigma CIB_j^2 - (\Sigma CIB_j)^2}$$

in which in the summations "$\Sigma$" the index j runs from 1 to k inclusive. For the linear regression the value of the number of samples k taken in the measuring period should not be too small. To save space in the storage arrangements 13 and 14 the cumulated values $\Sigma CIB_j \cdot y_j, \Sigma CIB_j, \Sigma y_j$ and $\Sigma CIB^2$ can be kept rather than the individual sample values. In that case only four memory locations will be required. The call acceptance limit $CAL_i$ will then be determined according to $$CAL_i = int((y_{min} - B)/A) \quad (3)$$

where "$int((y_{min} - B)/A)$" stands for taking the integer value. The result of this calculation $CAL_i$ is written into register 19.

The arrangement further comprises an (up/down) counter 20 arranged to count the number of calls in buildup phase. The counter 20 thereto comprises a first input 21 to which an acceptance unit 23 is connected for incrementing the counting position of counter 20 each time a call is allowed to enter the build-up phase. The counter 20 further has a second input 22 arranged to decrement the counting position of counter 20 each time a call has been processed. Thus the counting position of counter 20 always shows the instantaneous value of the number of calls in build-up phase.

If a call is detected by call detector 12 a difference-producing unit 25 is activated via connection 24. The counting positions of register 20 (CIB) supplied to the input of difference-producing unit 25 are compared with the value ($CAL_i$) stored in register 19. If $CIB < CAL_i$ a control signal coming from difference-producing unit 25 (indicated by a dashed line in the figure) makes a change-over switch 26 assume position 26-1. This results in the acceptance unit 23 informing the subscriber set $T_j$ via call detector 12 that the offered call has been accepted and is allowed to enter the build-up phase. At the same time the acceptance unit increments the counting position by one via input 21 of counter 20. However, if $CIB < CAL_i$, the change-over switch 26 is brought into position 26-2 by a control signal coming from the difference-producing unit 25 and it is reported to the subscriber set $T_j$ by the reject unit 27 via the call detector 12 that the offered call is rejected.

The call-acceptance limit $CAL_i$ is valid for a second period of a predetermined length. This limit holds for all calls offered during this period. In a consecutive second period a new value of $CAL_i$ is used. The number of calls in build-up phase is determined during or at the end of such a second period and supplied to storage arrangement 14 via input 28 and then forms the most recent sample. Thus the number of calls in build-up phase during that period is a contributory factor for the acceptance limit in the future k sub-periods.

If the last value of the queue length $N_i$ shows a sudden increase, this could give rise to not accepting any new calls during the period $i+1$ to avoid imminent overload.

It is further useful for some applications, with $CIB \geq CAL_i$, to have new calls wait for a short time as n that time CIB may become smaller than $CAL_i$. So doing a more complete utilization of the processor of the central control can be achieved.

It can likewise be useful to have the call acceptance depend on the urgency, importance etc. of the call. Calls which enter via trunk lines may, for example, be given a higher priority than calls coming directly from subscribers, as the telecommunication system has invested more in the first-mentioned calls. This can be implemented by giving $y_{min}$ in formula (3) a higher value ($y_{min,h}$) for calls having a higher priority than for calls having a lower priority ($y_{min,l}$). For this determines $CAL_i(y_{min,h})$ and $CAL_i(y_{min,l})$. Both values are applied to difference producing unit 25. In the event that the acceptance of a call having a higher priority has to be considered this is decided on the basis of the result of the inequality $$CIB < CAL_i(y_{min,h}) \qquad (4a)$$

and in the event of a lower priority on the basis of the inequality $$CIB < CAL_i(y_{min,l}) \qquad (4a)$$

This differentiation accomplishes a more economical use of the central control.

It should be noted that the arrangement can be realized by means of universal sequential logic circuits such as commercially available microprocessors with associated memories and peripheral equipment. The processor of the central control might (also) be used to advantage for that purpose.

Although only calls and calls in build-up phase have been discussed so far, this strategy for overload control is not restricted to subscriber-related tasks. Other sources of processor load such as POM (Project engineering and Operational Maintenance) and SAS (System ASsurance) can also be taken into consideration. Dependent on the scope of the tasks resulting from this processor load they can correspond as regards their load to a part of the load of a call in build-up phase (CIB) or a multitude thereof. By giving these tasks a weighting factor according to their load value the resulting load can be calculated in CIB equivalents. This implies that a POM task is for example reckoned as five CIB tasks if the load caused by the POM task loads the processor five times as much as a call in build-up phase.

What is claimed is:

1. A method of overload control for the central control of a telecommunication system, more specifically a telephone exchange of the SPC type, the method comprising the following steps:
   (1) determining the number of calls in build-up phase in a first period of a predetermined length;
   (2) determining the demand on the capacity of the processor of the central control in the first period;
   (3) estimating the maximum number of calls in the build-up phase which the processor is capable of processing simultaneously in a second period of a predetermined length;
   (4) determining with each new offered call in the second period whether as a result of the new call the instantaneous number of calls in build-up phase reaches the maximum number of calls determined in step (3);
   (5) accepting the offered call if the number of calls estimated in step (3) was not reached;
   (6) rejecting the offered all if the estimated number was reached;
   (7) repeating steps (1) to (6) in a subsequent first period for evaluating calls in a subsequent second period; wherein the improvement comprises:
   (8) using the number of tasks waiting to be processed by the processor ("the queue length") as a criterion for the demand on the capacity to be determined in step (2); and
   (9) making the estimation in step (3) based on the number of calls in build-up phase and the queue length in the first period.

2. A method as claimed in claim 1, comprising making the estimation according to step (3) with a parameter (y) derived from the queue length ($N_i$) according to the relationship $y = /(1+N_i)$.

3. A method as claimed in claim 1 or 2, wherein the aforesaid first period comprises k ($k>2$) sub-periods,
   in each sub-period the number of calls in build-up phase determined in step (1) is detected as well as the queue length determined in step (2) as modified by step (8), and
   the estimation made in step (3) is based on two sets of k numbers of calls in build-up phase and k queue lengths, which sets result from steps (1) and (2) as modified by (8).

4. An arrangement for implementing the method of overload control for the central control of a telecommunication system as claimed in claim 1, comprising
   a first storage arrangement (13),
   a second storage arrangement (14) for storing the value of the number of calls in build-up phase in the first period,
   a second arithmetic unit (18) for determining the maximum number of calls that can be in the build-up phase from the stored values of the two storage arrangements (13,14),
   a counter (20) arranged to count the instantaneous number of calls in the build-up phase in a second period,
   a difference-producing unit (25) for comparing the counting position with the maximum number of calls that can be in the build-up phase,
   a change-over switch (26),
   an acceptance unit (23) and
   a call detector (12),
   the change-over switch (26) controllably connecting the acceptance unit (23) or a reject unit (27) to the call detector (12) under the control of the difference-producing unit (25), the acceptance unit (23) being connected to an input (21) of the counter (20) for incrementing by one the counting position when a call is accepted, an output (28) of the counter being connected to an input of the second storage arrangement (14) for recording the counting position during or at the end of the second period, characterized in that the arrangement comprises a register (16) for temporarily storing the value of the queue length of a queue of calls waiting to be processed and a first arithmetic unit (17) connected to an output of the aforesaid register (16) for determining a magnitude related to the queue length, which magnitude is stored in the first storage arrangement (13) connected to an output of the first arithmetic unit (17).

5. Apparatus for controlling overload in the central control of a telecommunication system comprising:
  a. a register for temporarily storing a value of a length of a queue of calls waiting to be processed;
  b. a first arithmetic unit for determining a magnitude related to the queue length;
  c. first means for storing at least one value of the magnitude;
  d. second means for storing at least one value of a number of calls which are in build-up phase during a first time period;
  e. a second arithmetic unit for estimating a maximum number of calls in the build-up phase which can be processed, based on the values stored in the first and second storing means;
  f. a counter for counting an instantaneous number of calls in build-up phase during a second time period, the counter having an output coupled to an input of the second means for storing so that a counting position of the counter is stored in the second means for storing at the end of the second time period;
  g. a difference-producing circuit for comparing the counting position of the counter with the maximum number;
  h. a call acceptance unit, coupled to an input of the counter for incrementing the counting position of the counter by one when a call is accepted;
  i. a call reject unit;
  j. a call detector; and
  k. a change-over switch for controllably connecting the call detector to one of the call acceptance unit and the call reject unit, under the control of the difference-producing circuit.

* * * * *